US009589362B2

United States Patent
Sarkis et al.

(10) Patent No.: US 9,589,362 B2
(45) Date of Patent: Mar. 7, 2017

(54) SYSTEM AND METHOD OF THREE-DIMENSIONAL MODEL GENERATION

(71) Applicant: QUALCOMM Incorporated, San Diego, CA (US)

(72) Inventors: Michel Adib Sarkis, San Diego, CA (US); Sairam Sundaresan, San Diego, CA (US); Kuen-Han Lin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 45 days.

(21) Appl. No.: 14/469,468

(22) Filed: Aug. 26, 2014

(65) Prior Publication Data

US 2016/0005211 A1 Jan. 7, 2016

Related U.S. Application Data

(60) Provisional application No. 62/019,854, filed on Jul. 1, 2014.

(51) Int. Cl.
*G06T 15/08* (2011.01)
*G06T 7/20* (2006.01)
(Continued)

(52) U.S. Cl.
CPC ............. *G06T 7/20* (2013.01); *G06T 1/0007* (2013.01); *G06T 17/00* (2013.01); *G06T 19/00* (2013.01);
(Continued)

(58) Field of Classification Search
CPC ......... G06T 19/00; G06T 17/20; G06T 17/00; G06T 15/10; G06T 15/00
See application file for complete search history.

(56) References Cited

U.S. PATENT DOCUMENTS 6,101,272 A    8/2000   Noguchi
6,281,904 B1   8/2001   Reinhardt et al.
(Continued)

FOREIGN PATENT DOCUMENTS

CN    102364953 A    2/2012
EP      1022654 A2    7/2000
(Continued)

OTHER PUBLICATIONS

Zhang, Dianyong et al.; Photorealistic 3D Volumetric Model Reconstruction by Voxel Coloring; Sep. 2010; vol. XXXVIII, Part 3B.*
(Continued)

*Primary Examiner* — Todd Buttram
(74) *Attorney, Agent, or Firm* — Toler Law Group, PC

(57) ABSTRACT

A method includes generating, at an electronic device, a three-dimensional model of an object based on a sequence of images captured by an image capture device associated with the electronic device. The method further includes displaying the three-dimensional model via a display device associated with the electronic device. The method also includes, based on detecting that the three-dimensional model includes an anomaly, presenting, via the display device, one or more selectable options to enable correction of the anomaly.

28 Claims, 9 Drawing Sheets

(51) Int. Cl.
*G06T 19/20* (2011.01)
*G06T 1/00* (2006.01)
*G06T 17/00* (2006.01)
*G06T 19/00* (2011.01)

(52) U.S. Cl.
CPC ...... *G06T 2200/08* (2013.01); *G06T 2200/24* (2013.01); *G06T 2210/12* (2013.01)

(56) References Cited

U.S. PATENT DOCUMENTS

| | | | |
|---|---|---|---|
| 6,297,825 B1* | 10/2001 | Madden | G06T 5/002 345/419 |
| 6,469,710 B1 | 10/2002 | Shum et al. | |
| 6,476,803 B1* | 11/2002 | Zhang | G06T 15/00 345/419 |
| 6,487,304 B1 | 11/2002 | Szeliski | |
| 6,750,873 B1 | 6/2004 | Bernardini et al. | |
| 8,036,441 B2 | 10/2011 | Frank et al. | |
| 8,149,268 B1 | 4/2012 | Meyers et al. | |
| 8,326,035 B2 | 12/2012 | Ubillos et al. | |
| 8,471,890 B1 | 6/2013 | Golas | |
| 8,587,583 B2 | 11/2013 | Newcombe et al. | |
| 2003/0001837 A1 | 1/2003 | Baumberg | |
| 2004/0189686 A1* | 9/2004 | Tanguay | G06Q 40/08 715/716 |
| 2005/0057561 A1 | 3/2005 | El-Din ElShishiny et al. | |
| 2005/0140670 A1 | 6/2005 | Wu et al. | |
| 2005/0285872 A1 | 12/2005 | Wang et al. | |
| 2010/0074532 A1* | 3/2010 | Gordon | G01B 11/25 382/203 |
| 2010/0223032 A1* | 9/2010 | Reghetti | G06T 19/20 703/1 |
| 2011/0187820 A1 | 8/2011 | Gilboa et al. | |
| 2012/0177269 A1* | 7/2012 | Lu | G06K 9/4609 382/131 |
| 2012/0182392 A1 | 7/2012 | Kearns et al. | |
| 2012/0300020 A1 | 11/2012 | Arth et al. | |
| 2013/0004060 A1 | 1/2013 | Bell et al. | |
| 2013/0100119 A1 | 4/2013 | Evertt et al. | |
| 2013/0136341 A1* | 5/2013 | Yamamoto | G06T 17/00 382/154 |
| 2013/0272570 A1* | 10/2013 | Sheng | G06F 3/017 382/103 |
| 2013/0286161 A1 | 10/2013 | Lv et al. | |
| 2013/0314501 A1 | 11/2013 | Davidson et al. | |
| 2013/0322767 A1 | 12/2013 | Chao et al. | |
| 2013/0336589 A1 | 12/2013 | Takahashi et al. | |
| 2014/0002597 A1 | 1/2014 | Taguchi et al. | |
| 2014/0132715 A1 | 5/2014 | Raghoebardayal et al. | |
| 2014/0168262 A1 | 6/2014 | Forutanpour et al. | |
| 2014/0210947 A1 | 7/2014 | Finn et al. | |
| 2014/0225985 A1 | 8/2014 | Klusza et al. | |
| 2014/0267618 A1* | 9/2014 | Esteban | G06T 5/003 348/46 |
| 2015/0049083 A1* | 2/2015 | Bidne | G06T 19/006 345/420 |
| 2015/0098645 A1 | 4/2015 | Leung | |
| 2015/0178988 A1 | 6/2015 | Montserrat et al. | |
| 2015/0187140 A1 | 7/2015 | Tseng et al. | |
| 2015/0302601 A1* | 10/2015 | Rivet-Sabourin | G01R 33/5608 382/131 |
| 2016/0086336 A1 | 3/2016 | Lin et al. | |
| 2016/0171767 A1 | 6/2016 | Anderson | |
| 2016/0232715 A1 | 8/2016 | Lee | |
| 2016/0335782 A1 | 11/2016 | Sundaresan et al. | |
| 2016/0335792 A1 | 11/2016 | Forutanpour et al. | |
| 2016/0335809 A1 | 11/2016 | Forutanpour et al. | |

FOREIGN PATENT DOCUMENTS

| | | |
|---|---|---|
| EP | 2545411 B1 | 2/2014 |
| JP | 2010020487 A | 1/2010 |
| WO | 9926198 A2 | 5/1999 |
| WO | 2013165440 A1 | 11/2013 |
| WO | WO 2013165440 A1 * | 11/2013 ........... G06T 7/0065 |

OTHER PUBLICATIONS

Benhimane S., et al., "Real-Time Image-Based Tracking of Planes using Efficient Second-Order Minimization," Intelligent Robots and Systems (IROS 2004), Proceedings of IEEE/RSJ International Conference on, 2004, vol. 1, pp. 943-948.

Berger K., et al., "A State of the Art Report on Kinect Sensor Setups in Computer Vision," Time-of-Flight and Depth Imaging Sensors, Algorithms, and Applications, Lecture Notes in Computer Science, 2013, vol. 8200, pp. 257-272.

"Dense Visual SLAM," Technical University of Munich, Retrieved date Jan. 5, 2014, Retrieved from the Internet < URL: http://vision.in.tum.de/data/software/dvo >, 4 pages.

Gorman M, "Lynx A 3D point-and-shoot camera/tablet does motion capture and 3D modeling, we go hands-on," Apr. 17, 2013, 3 pages.

Kerl C., et al., "Dense Visual SLAM for RGB-D Cameras," Proceedings of IEEE/RSJ International Conference on Intelligent Robots and Systems (IROS), 2013, pp. 2100-2106.

Kerl C., et al., "Robust Odometry Estimation for RGB-D Cameras," IEEE International Conference on Robotics and Automation (ICRA), 2013, pp. 3748-3754.

Kim S., et al., "Relocalization Using Virtual Keyframes for Online Environment Map Construction," Proceedings of the 16th ACM Symposium on Virtual Reality Software and Technology (VRST), Nov. 2009, pp. 127-134.

Klein G., et al., "Parallel Tracking and Mapping for Small AR Workspaces," 6th IEEE and ACM International Symposium on Mixed and Augmented Reality, 2007. ISMAR 2007. pp. 225-234.

Whelan T., et al., "Robust Real-Time Visual Odometry for Dense RGB-D Mapping," IEEE International Conference on Robotics and Automation (ICRA), 2013, pp. 5724-5731.

"Artec Studio 9 User Guide v 9.2," Retrieved from <<http://artec-group.com/sw/ug/ug.pdf>>, Jun. 5, 2014, ARTEC Group, Luxembourg, 135 pages.

Baumberg, A., "Blending images for texturing 3D models", Proc. Conf. on British Machine Vision Association, 2002, British Machine Vision Association, Durham, England, pp. 404-413.

Benhimane, S., et al., "Real-Time Image-Based Tracking of Planes using Efficient Second-Order Minimization," Intelligent Robots and Systems (IROS 2004), Proceedings of IEEE/RSJ International Conference on, 2004, vol. 1, IEEE, Piscataway, NJ, pp. 943-948.

Du, H., et al., "Interactive 3D Modeling of Indoor Environments with a Consumer Depth Camera," Proceedings of the 13th International Conference on Ubiquitous Computing, Sep. 17, 2011, pp. 75-84.

Grammatikopoulos, L., et al., "Automatic Multi-View Texture Mapping of 3d Surface Projections," Proceedings of the 2nd ISPRS International Workshop 3D-ARCH, 2007, International Society for Photogrammetry and remote Sensing, International Council for Science, Paris, France, 6 Pages.

Ha, J., et al., "Real-time Scalable Recognition and Tracking based on the Server-client Model for Mobile Augmented Reality," VR Innovation (ISVRI), 2011 IEEE International Symposium on, Mar. 19, 2011, IEEE Piscataway NJ, pp. 267-272.

Herrera, C. D., et al., "Joint Depth and Color Camera Calibration with Distortion Correction", TPAMI, 2012, pp. 1-8.

Huo, J.-Y., et al., "Robust Automatic White Balance Algorithm using Gray Color Points in Images" Consumer Electronics, IEEE Transactions on, vol. 52, No. 2, May 2006, IEEE, Piscataway, NJ, pp. 541-546.

International Search Report and Written Opinion for International Application No. PCT/US2015/038243, ISA/EPO, Date of Mailing Mar. 2, 2016, 23 pages.

Khalfaoui, S., et al., "Fully Automatic 3D Digitization of unknown Objects using Progressive Data Bounding Box," Proceedings of SPIE, Feb. 9, 2012, vol. 8290, pp. 1-8.

(56) References Cited

OTHER PUBLICATIONS

Lempitsky, V., et al., "Seamless Mosaicing of Image-Based Texture Maps," IEEE Conference on Computer Vision and Pattern Recognition, CVPR '07, 2007, IEEE, Piscataway, NJ, 6 Pages.

Li, M. et al., "3-D Motion Estimation and Online Temporal Calibration for Camera-IMU Systems," 2013 IEEE International Conference on Robotics and Automation (ICRA), 2013, IEEE, Piscataway, NJ, pp. 5709-5716.

Pighin, F., et al., "Synthesizing Realistic Facial Expressions from Photographs," SIGGRAPH '98: Proceedings of the 25th annual conference on Computer graphics and interactive techniques, 1998, ACM, New York, New York, pp. 75-84.

Shinozaki, M., et al., "Correction of Color Information of a 3D Model using a Range Intensity Image," Computer Vision and Image Understanding, 2009, vol. 113, Elsevier, Amsterdam, Netherlands, pp. 1170-1179.

Vacchetti, L., et al., "Fusing Online and Offline Information for Stable 3D Tracking in Real-time," Proceedings / 2003 IEEE Computer Society Conference on Computer Vision and Pattern Recognition, Jun. 2003, vol. 2, Jun. 18, 2003, IEEE, Piscataway, NJ, pp. 241-248.

Zhang, D., et al., "Photorealistic 3D Volumetric Model Reconstruction by Voxel Coloring," Sep. 1, 2010, Retrieved from <<http://www.isprs.org/proceedings/XXXVIII/part3/b/pdf/92_XXXVIII-part3B.pdf>>, pp. 92-97.

Alshawabkeh Y., et al., "Automatic Multi-Image Photo-Texturing of Complex 3D Scenes," International Symposium CIPA 2005, Sep. 26, 2005 (Sep. 26, 2005), pp. 1-6, XP007914583, section 3.3 Summary of the Overall Procedure.

Cooper T., et al., "Novel Approach to Color Cast Detection and Removal in Digital Images", Optomechatronic Micro/Nano Devices and Components III : Oct. 8-10, 2007, Lausanne, Switzerland, [Proceedings of SPIE , ISSN 0277-786X], Spie, Bellingham, Wash, vol. 3963, 2000, pp. 167-177, XP002471492, DOI: 10.1117/12.373394 ISBN: 978-1-62841-730-2 the whole document.

Gasparini F., et al., "Color Balancing of Digital Photos Using Simple Image Statistics", Pattern Recognition, Elsevier, GB, vol. 37, No. 6, Jun. 2004 (Jun. 2004), pp. 1201-1217, XP004505321, ISSN: 0031-3203, DOI: 10.1016/J.PATCOG.2003.12.007 the whole document.

International Search Report and Written Opinion—PCT/US2016/020474—ISA/EPO—Jun. 8, 2016 (153171WO).

Neugebauer P.J., et al., "Texturing 3D Models of real World Objects from Multiple Unregistered Photographic Views," Computer Graphics Forum, Wiley-Blackwell Publishing Ltd, GB, vol. 18, No. 3, Sep. 7, 1999 (Sep. 7, 1999), p. C245, XP001034480, ISSN: 0167-7055, DOI: 10.1111/1467-8659.00345.

Niem W., et al., "Automatic Reconstruction of 3D Objects using a Mobile Camera," Image and Vision Computing, Elsevier, Guildford, GB, vol. 17, No. 2, Feb. 1999 (Feb. 1999), pp. 125-134, XP002258790, ISSN: 0262-8856, DOI: 10.1016/S0262-8856(98)00116-4 p. 131.

Ofek E., et al., "Multiresolution Textures from Image Sequences," IEEE Computer Graphics and Applications, IEEE Service Center, New York, NY, US, vol. 17, No. 2, Mar. 1997 (Mar. 1997), pp. 18-29, XP000927819, ISSN: 0272-1716, DOI: 10.1109/38.574667 pp. 20,21.

Pulli K., et al., "Acquisition and Visualization of Colored 3D Objects," Pattern Recognition, 1998, Proceedings. Fourteenth International Conference on Brisbane, QLD., Australia Aug. 16-20, 1998, Los Alamitos, CA, USA,IEEE Computer Society, US, vol. 1, Aug. 16, 1998 (Aug. 16, 1998), pp. 11-15, XP010297445, DOI: 10.1109/ICPR.1998.711067 ISBN: 978-0-8186-8512-5.

Weng C.-C., et al., "A Novel Automatic White Balance Method for Digital Still Cameras", Conference Proceedings / IEEE International Symposium on Circuits and Systems (ISCAS) : May 23-26, 2005, International Conference Center, Kobe, Japan, IEEE Service Center, Piscataway, NJ, May 23, 2005 (May 23, 2005), pp. 3801-3804, XP010816492, DOI: 10.1109/ISCAS.2005.1465458 ISBN: 978-0-7803-8834-5 section III.

Rohs M., "Marker-Based Embodied Interaction for Handheld Augmented Reality Games", JVRB Journal of Virtual Reality and Broadcasting, Feb. 6, 2007, Retrieved from Internet on Oct. 24, 2016, https://www.jvrb.org/pastissues/4.2007/793, pp. 1-15.

\* cited by examiner

SYSTEM AND METHOD OF THREE-DIMENSIONAL MODEL GENERATION

I. CLAIM OF PRIORITY

This application claims priority from U.S. Provisional Patent Application No. 62/019,854, filed on Jul. 1, 2014, and entitled "SYSTEM AND METHOD OF 3D MODEL GENERATION," the contents of which are incorporated herein in their entirety.

II. FIELD

The present disclosure is generally related to a system and method of three-dimensional (3D) model generation.

III. DESCRIPTION OF RELATED ART

Advances in technology have resulted in smaller and more powerful computing devices. For example, there currently exist a variety of portable personal computing devices, including wireless telephones such as mobile and smart phones, tablets and laptop computers that are small, lightweight, and easily carried by users. These devices can communicate voice and data packets over wireless networks. Further, many such devices incorporate additional functionality such as a digital still camera, a digital video camera, a digital recorder, and an audio file player. Also, such devices can process executable instructions, including software applications, such as a web browser application, that can be used to access the Internet. As such, these devices can include significant computing capabilities.

Wireless telephones and similar devices may be configured to capture images. Such images may be used to generate a three-dimensional (3D) model of an object. Generally, devices for generating 3D models do not generate the 3D models in real time or near real time relative to the rate of capturing the images. Rather, a sequence of image frames is captured (e.g., by a camera), and the sequence of image frames is subsequently processed as a group (e.g., concurrently at a processing system, such as a computer) to generate the 3D model. If the sequence of image frames is insufficient or inadequate to generate a complete 3D model, such insufficiency or inadequacy may go unnoticed until after processing to generate the 3D model is completed. In this case, an incomplete or inaccurate 3D model may be generated. To generate a more complete or more accurate 3D model, a new sequence of images of the object may be captured and processed.

IV. SUMMARY

The disclosure herein enables real time or near real time generation of a 3D point cloud and/or a 3D model based on a captured sequence of image frames. The sequence of image frames may be captured by an image capture device (e.g., a camera). A user (e.g., an operator) of the image capture device may move the image capture device around an object to capture the sequence of image frames of the object. In a particular embodiment, the user may identify a region of interest (e.g., an area corresponding to the object) in one of the images. In this embodiment, a computing device associated with or including the image capture device may determine a bounding box associated with the object (e.g., associated with the 3D model) based on the region of interest. The bounding box may be changed as additional images are captured and as the 3D model is updated (e.g., by using the object in the images to update the location or size of the bounding box in the 3D model).

Additionally, the disclosure herein enables correction of anomalies in the 3D model. For example, if an anomaly is detected after the 3D model is generated based on a sequence of images, the user may be notified of the anomaly. The user may also be presented with one or more options to correct the anomaly, such as an option to capture additional images or an option to automatically fill in the anomaly based on an algorithm.

Further, since the 3D model can be generated in real time or near real time (e.g., at a rate approximately equal to the rate at which images of the sequence of images are captured and concurrent to capturing of the sequence of images), the computing device can notify the user if the image capture device is moving too quickly to gather sufficient data to generate an accurate 3D model. For example, a speed of movement of the image capture device relative to the object in a scene may be estimated (e.g., by estimating a camera pose and a corresponding time stamp for each image). The speed of movement of the image capture device may be compared to a speed threshold, and the user may be notified if the speed threshold is satisfied.

In a particular embodiment, a method includes generating, at an electronic device, a three-dimensional model of an object based on a sequence of images captured by an image capture device associated with the electronic device. The method further includes displaying the three-dimensional model via a display device associated with the electronic device. The method also includes, based on detecting that the three-dimensional model includes an anomaly, presenting, via the display device, one or more selectable options to enable correction of the anomaly.

In another particular embodiment, an apparatus includes an image capture device configured to capture a sequence of images, a display device configured to output a graphical user interface and a processor. The processor is configured to generate a three-dimensional model of an object based on the sequence of images. The processor is also configured to generate the graphical user interface depicting the three-dimensional model. The processor is further configured to, based on detecting that the three-dimensional model includes an anomaly, present, via the graphical user interface, one or more selectable options to enable correction of the anomaly.

In another particular embodiment, a computer-readable storage device is disclosed. The computer-readable storage device includes instructions that, when executed by a processor, cause the processor to generate a three-dimensional model of an object based on a sequence of images captured by an image capture device. The instructions also cause the processor to display the three-dimensional model via a display device. The instructions further cause the processor to, based on detecting that the three-dimensional model includes an anomaly, present, via the display device, one or more selectable options to enable correction of the anomaly.

In yet another particular embodiment, an apparatus includes means for capturing a sequence of images. The apparatus also includes means for generating a three-dimensional model of an object based on a sequence of images. The apparatus further includes means for generating a graphical user interface depicting the three-dimensional model. The apparatus also includes means for detecting that the three-dimensional model includes an anomaly. The means for generating the graphical user interface is configured to present one or more selectable options to enable correction of the anomaly.

In another particular embodiment, a method includes receiving, at an electronic device, a selection of an object depicted in a two-dimensional image that is representative of a scene. The method also includes determining a bounding box associated with the object. The method further includes generating, based on the bounding box, a three-dimensional model of the object during capture of a sequence of images associated with the scene.

In another particular embodiment, an apparatus includes an image capture device configured to capture a sequence of images, a display device configured to output a graphical user interface, and a processor. The processor is configured to receive a selection of an object depicted in a two-dimensional image. The process is also configured to determine a bounding box associated with the object. The processor is further configured to generate, based on the bounding box, a three-dimensional model of the object during capture by the image capture device of the sequence of images.

In another particular embodiment, a computer-readable storage device is disclosed. The computer-readable storage device includes instructions that, when executed by a processor, cause the processor to receive a selection of an object depicted in a two-dimensional image that is representative of a scene. The instructions also cause the processor to determine a bounding box associated with the object. The instructions also cause the processor to generate, based on the bounding box, a three-dimensional model of the object during capture of a sequence of images associated with the scene.

In yet another particular embodiment, an apparatus includes means for capturing a sequence of images associated with a scene. The apparatus also includes means for receiving a two-dimensional selection of an object depicted in an image. The apparatus further includes means for determining a bounding box associated with the object. The apparatus also includes means for generating, based on the bounding box, a three-dimensional model of the object during capture of the sequence of images.

In another particular embodiment, a method includes estimating, at an electronic device, a sequence of camera poses based on a sequence of images captured at an image capture device associated with the electronic device, where the sequence of camera poses is used to generate a three-dimensional model of an object. The method also includes calculating, based on the sequence of camera poses, a speed associated with movement of the image capture device relative to the object. The method further includes selectively outputting a notification via an output interface of the electronic device based on a comparison of the speed to a speed threshold.

In another particular embodiment, an apparatus includes an image capture device configured to capture a sequence of images, a display device configured to output a graphical user interface, and a processor. The processor is configured to estimate a sequence of camera poses based on the sequence of images, where the sequence of camera poses is used to generate a three-dimensional model of an object. The processor is also configured to calculate, based the sequence of camera poses, a speed associated with movement of the image capture device relative to the object. The processor is further configured to generate, based on a comparison of the speed to a speed threshold, a notification to be output via the output interface.

In another particular embodiment, a computer-readable storage device is disclosed. The computer-readable storage device includes instructions that, when executed by a processor, cause the processor to estimate a sequence of camera poses based on a sequence of images captured by an image capture device, where the sequence of camera poses is used to generate a three-dimensional model of an object. The instructions also cause the processor to calculate, based on the sequence of camera poses, a speed associated with movement of the image capture device relative to the object. The instructions also cause the processor to selectively output a notification based on a comparison of the speed to a speed threshold.

In yet another particular embodiment, an apparatus includes means for capturing a sequence of images. The apparatus further includes means for calculating, based on the sequence of camera poses, a speed associated with movement of the means for capturing relative to the object, where the sequence of images is associated with the sequence of camera poses, and where the sequence of camera poses is used to generate a three-dimensional model of an object. The apparatus also includes means for outputting a notification based on a comparison of the speed to a speed threshold.

One particular advantage provided by at least one of the disclosed embodiments is that anomalies that can occur during generation of a 3D model can be corrected more readily (e.g., by notifying the user during generation of the 3D model or while the user is still gathering images to improve the 3D model). Additionally, by providing a user interface (and/or notifications) associated with the 3D model while the 3D model is being generated or updated, other errors can be avoided. For example, the user can be notified when he or she is moving the image capture device too quickly, enabling the user to capture images that are more useful for generation or updating of the 3D model.

Other aspects, advantages, and features of the present disclosure will become apparent after review of the entire application, including the following sections: Brief Description of the Drawings, Detailed Description, and the Claims.

V. BRIEF DESCRIPTION OF THE DRAWINGS

VI. DETAILED DESCRIPTION

Figure 1:
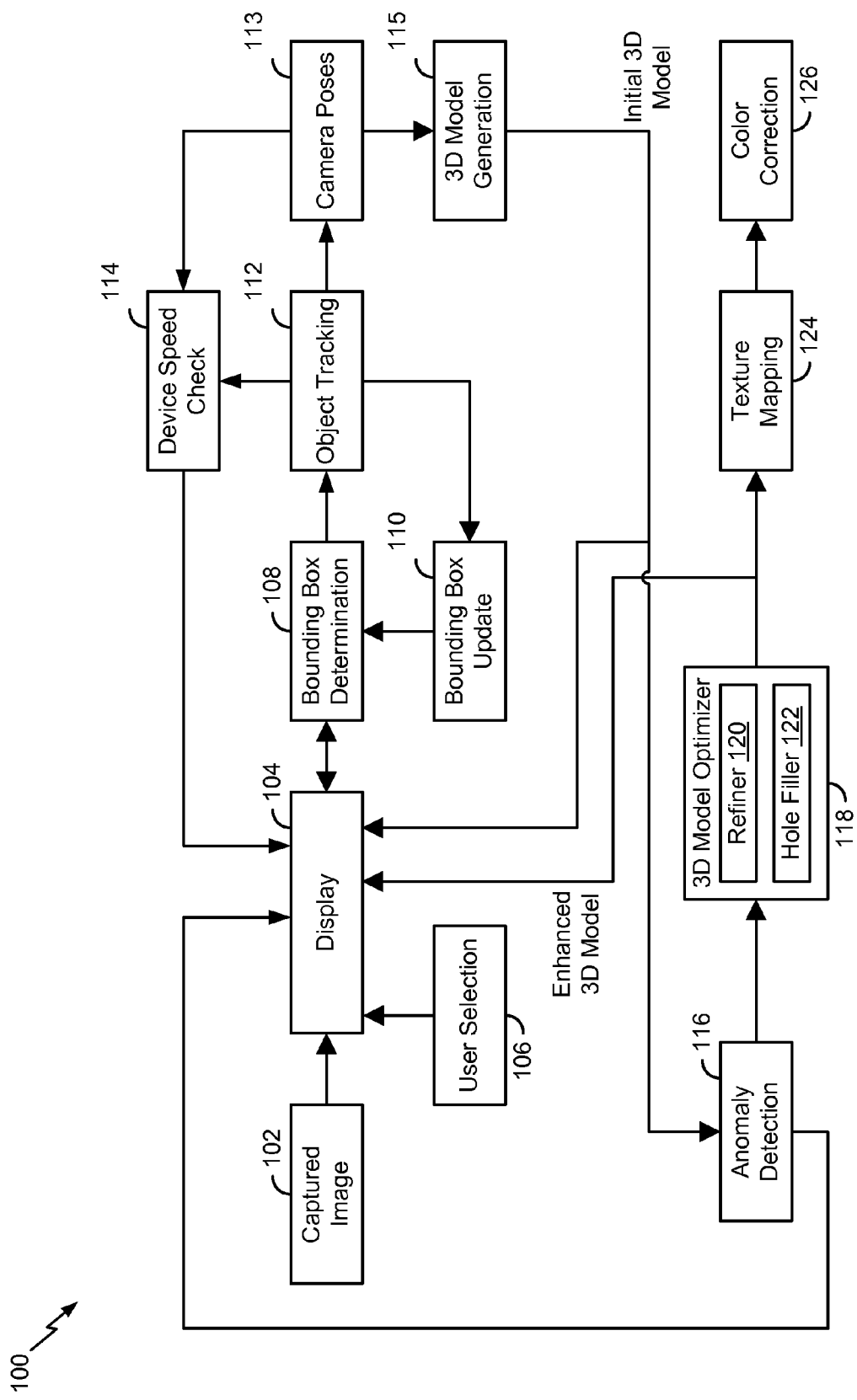
FIG. 1 is a block diagram of a particular illustrative embodiment of a system to generate a three-dimensional (3D) model based on a sequence of image frames.

FIG. 1 is a block diagram of a particular illustrative embodiment of a system 100 configured to generate a three-dimensional (3D) model based on a sequence of image frames. For example, the system 100 may generate a 3D model of an object based on a set of captured images 102. The set of captured images 102 may include a sequence of image frames captured by an image capture device, such as a two-dimensional camera (2D) camera, a 3D camera, a 3D sensor, a depth-sensing camera (e.g., a Red-Green-Blue-Depth (RGB-D) camera), or any other device configured to capture images. In alternative embodiments, multiple cameras may be used by the image capture device to obtain the set of captured images 102. The image capture device may be associated with a display 104 which may present (e.g., display) a representation of a 3D model based on the captured images 102. The displayed representation of the 3D model may be configured to enable a user to correct or enhance the 3D model after initial generation of the 3D model.

The captured images 102 may include multiple images (e.g., two-dimensional images, 3D images, image data, etc.) representative of a scene. For example, the scene may include one or more objects as well as background or other context of the object. In a particular embodiment, one or more of the captured images 102 may be represented via the display 104. For example, as a user captures images of the scene using a camera, the display 104 (and/or another user interface, such as a projector) may present the images to the user. Additionally, the display 104 (and/or another user interface, such as a keypad or a button) may be configured to enable the user to provide input related to the images. For example, the display 104 may receive a user selection 106. The user selection 106 may enable the user to select a region of interest that includes a particular object within the scene.

Figure 4:
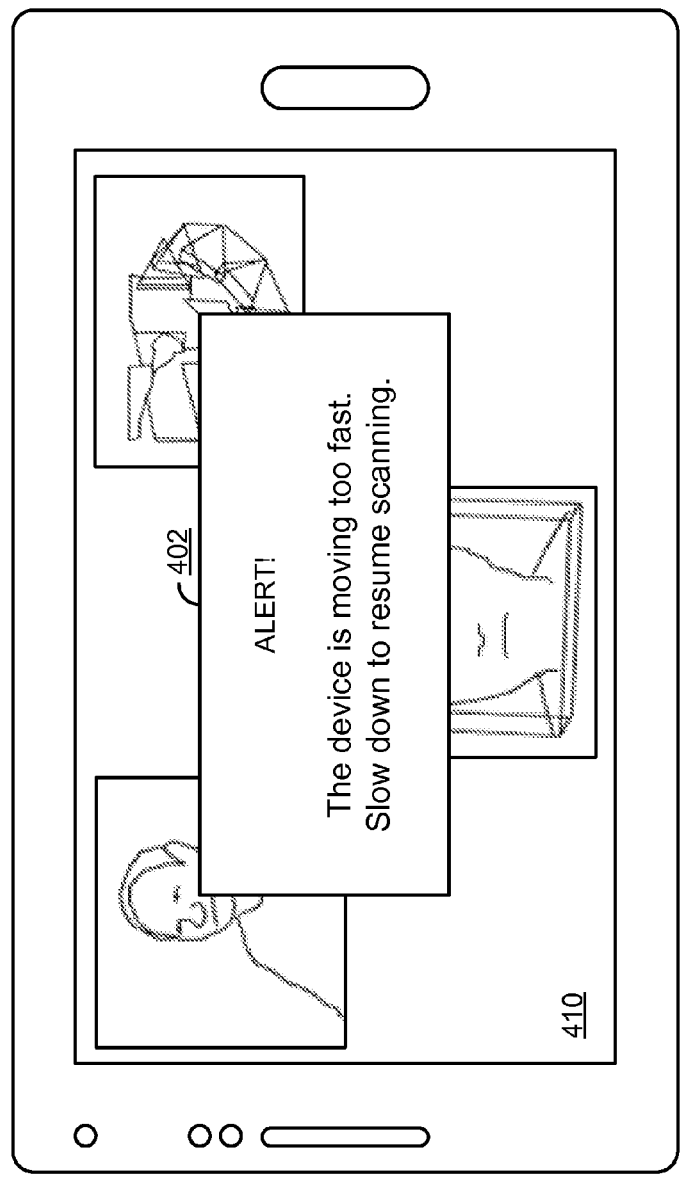
FIG. 4 is a diagram that illustrates a user interface notifying a user that an image capture device is moving too quickly.

For example, as illustrated in FIG. 4, the user selection 106 may include information specifying a bounding box around a particular object within the scene. The bounding box may correspond to a region of interest defined by the user. The region of interest may be displayed relative to one or more of the captured images at the display 104. A region of interest defined by the user may be used by the system 100 to determine a bounding box, at 108. The bounding box may be associated with the object in a three-dimensional model based on the captured images 102. For example, the bounding box may include or correspond to the region of interest based on object tracking as the camera moves relative to the object.

In a particular embodiment, the bounding box may correspond to a cube or other geometric region in three dimensions that corresponds to or includes an area (e.g., a volume) of the region of interest defined by the user via the display 104. As the camera continues to capture images, an object tracking module 112 may be used to track the region of interest or an object corresponding to the region of interest from one image frame to subsequent image frames. Based on the object tracking, the bounding box may be updated, at 110. For example, during generation of the three-dimensional model when the camera moves closer to or further from the object, a size parameter of the bounding box may be adjusted based on the object tracking. The bounding box may be associated with multiple size parameters (e.g., (x, y, z) dimension parameters, a center point (x, y, z) coordinate and a spherical radius, etc.). A particular size parameter may be associated with or correspond to a particular dimension of the bounding box (e.g., length, width, or depth). The value of the size parameter may be adjusted based on determining that the object is larger in the bounding box in one image than in a previous image.

In another example, a value of a position parameter of the bounding box may be adjusted based on tracking the object within the bounding box at the object tracking module 112. To illustrate, the object may move from image frame to image frame in the set of captured images 102 based on movement of the object relative to the scene or movement of the object relative to the camera. The value of the position parameter may be adjusted based on the relative position of the object in the sequence of images.

The sequence of images may be used to determine camera poses (e.g., camera pose data), at 113. The camera poses 113, the object tracking module 112, or both, may be used to determine a device speed. For example, during generation of the captured images 102, a device speed check unit 114 may determine a speed of the image capture device relative to the object based on a plurality of camera poses, based on a plurality of timestamps associated with the camera poses, or both. For example, the speed may be determined based on a calculation of a relative position of a camera corresponding to each camera pose and a timestamp associated with the camera pose. When the speed satisfies a speed threshold, a notification may be presented via the display 104.

In some embodiments, the speed may satisfy the speed threshold when the speed is greater than or equal to the speed threshold. In an alternative embodiment, the speed may satisfy the speed threshold if the speed is within a range of speeds that correspond to the speed threshold. In one embodiment, the notification may suggest that the speed of the image captured device should be reduced because the speed is greater than or equal to the speed threshold. For example, the speed may be reduced in order to reduce errors or to enable more images to be captured within a particular space in order to improve 3D model generation. In another embodiment, the speed may satisfy the speed threshold when the speed is less than or equal to the speed threshold. For example, the speed may be increased to reduce the number of redundant images being captured or to utilize additional processing capacity. Further, if the speed is less than or equal to a second speed threshold for a period of time, a notification may be presented via the display 104, and the capture of the sequence of image frames may be paused. For example, the second speed threshold and time may indicate a lack of movement (e.g., the camera is not moving or is relatively still). Capturing of the sequence of image frames may be resumed or reinstated when the camera resumes movement.

Thus, the device speed check unit 114 may calculate a speed associated with movement of the image capture device relative to the object and may selectively output a notification via the display 104 based on a comparison of the relative speed of movement of the image capture device to the speed threshold. In response to determining that the speed satisfies the speed threshold, the system 100 may pause capturing of a sequence of images while the notification is provided to the user.

The camera poses 113 may also be used by the 3D model generation unit 115 to generate a 3D model (e.g., an initial 3D model). An anomaly detection unit 116 may analyze the 3D model to determine whether the 3D model includes an anomaly (e.g., a discontinuity of a surface, a missing or incomplete region, etc.). If the anomaly detection unit 116 detects an anomaly in the 3D model, the anomaly detection unit 116 may cause the display 104 to display an indicator that identifies a location of the anomaly in the 3D model. Alternatively, the indicator may be presented via another user interface (e.g., audio speaker, light emitting diode (LED), etc.). The anomaly detection unit 116 may also provide the 3D model (or data representing the 3D model) to a 3D model optimizer 118.

The 3D model optimizer 118 or the anomaly detection unit 116 may cause the display 104 to present one or more selectable options to enable correction of the anomaly. In some embodiments, the options are selectable via a display (e.g., the display 104). In other embodiments, the options are selectable via one or more other user interfaces (e.g., a speaker, a microphone, a keypad, etc.). The options may include an option to activate a refiner unit 120 to enable the system 100 to capture additional images in order to correct the anomaly. The options may also include an option to activate a hole filler unit 122 to automatically generate fill data (e.g., based on a hole filling algorithm). If the refiner unit 120 is used to capture additional images, the additional images may be added to the captured images 102 to be processed by other units of the system 100 to generate a new or updated 3D model, which may also be analyzed by the anomaly detection unit 116.

The 3D model optimizer 118 may generate an enhanced 3D model (e.g., enhanced model data), which may be provided to the display 104. The enhanced 3D model may also be provided to a texture mapping unit 124, to a color correction unit 126, or to both, to perform color, light, or texture corrections based on the captured images 102 in the 3D model to further refine the 3D model for display at the display 104. The enhanced 3D model includes more details than the 3D model generated during the capture of the sequence of images. For example, the more details may include higher resolution, improved color mapping, smooth textures, smooth edges, etc.

Figure 2:
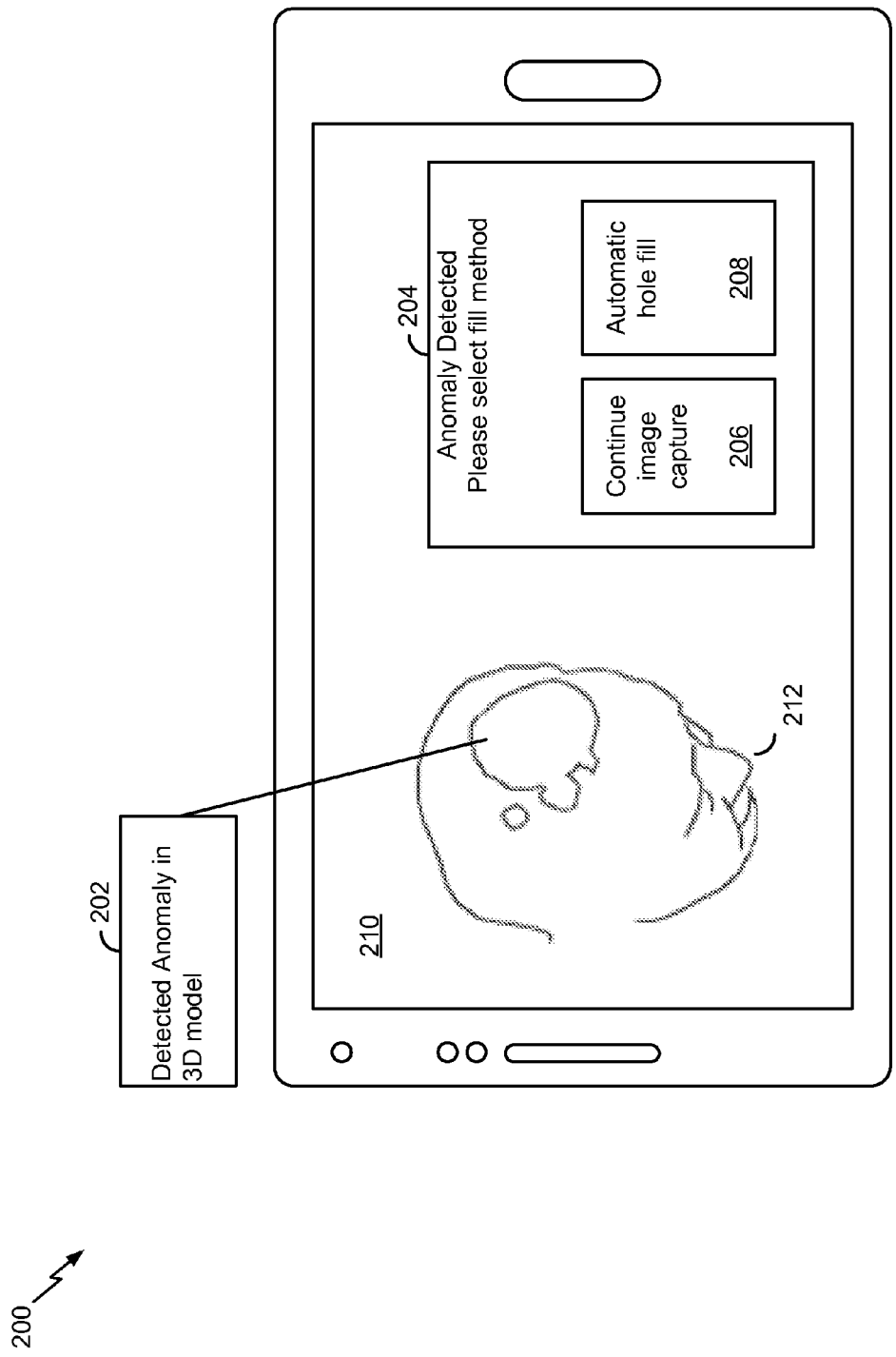
FIG. 2 is a diagram that illustrates a user interface notifying a user of an anomaly in a 3D model and providing selectable options to correct the anomaly.

FIG. 2 is a diagram that illustrates a user interface notifying a user of an anomaly in a 3D model and providing selectable options to correct the anomaly. In FIG. 2, a device 200 includes a user interface, such as a display 210. The device 200 may correspond to the system 100 of FIG. 1 and may be configured to perform one or more of the operations described with reference to the various units and modules of FIG. 1. For example, the display 210 of the device 200 may correspond to the display 104 of the anomaly detection unit 116 of FIG. 1.

In FIG. 2, the display 210 includes a representation of a three-dimensional model 212 and includes an indicator 202 of a detected anomaly in the three-dimensional model. In the particular example illustrated in FIG. 2, the indicator 202 of the detected anomaly is illustrated as a color-coded region (e.g., blacked out) within the representation of the three-dimensional model 212. In other embodiments, the indicator 202 may be illustrated by a colored outline (e.g., red or yellow) around the detected anomaly.

Additionally, the display 210 includes text 204 indicating that an anomaly has been detected and enables selection of a particular option to correct the anomaly. In the example illustrated in FIG. 2, displayed options include a selectable option 206 to continue image capture and a selectable option 208 to automatically fill the detected anomaly. In response to selection of selectable option 206 to continue image capture, the device 200 (and/or the display 210) may return to an image capture screen and may operate in an image capture mode, enabling the user to capture additional images of an object represented by the three-dimensional model in order to gather data to fill the detected anomaly. In response to selection of the selectable option 208 to automatically fill the hole, a hole-detection and correction algorithm may automatically generate data to fill the hole to correct the anomaly. In some embodiments, the selectable option 208 may be associated with the anomaly detection unit 116 of FIG. 1. The selectable option 208 may correspond to activating the refiner unit 120 of FIG. 1 or activating the hole filler unit 122 of FIG. 1. Although the selectable options 206 and 208 are selectable via the display 210, the selectable options 206 and 208 may also be selected via one or more other user interfaces (e.g., a keypad, buttons, etc.).

Figure 3:
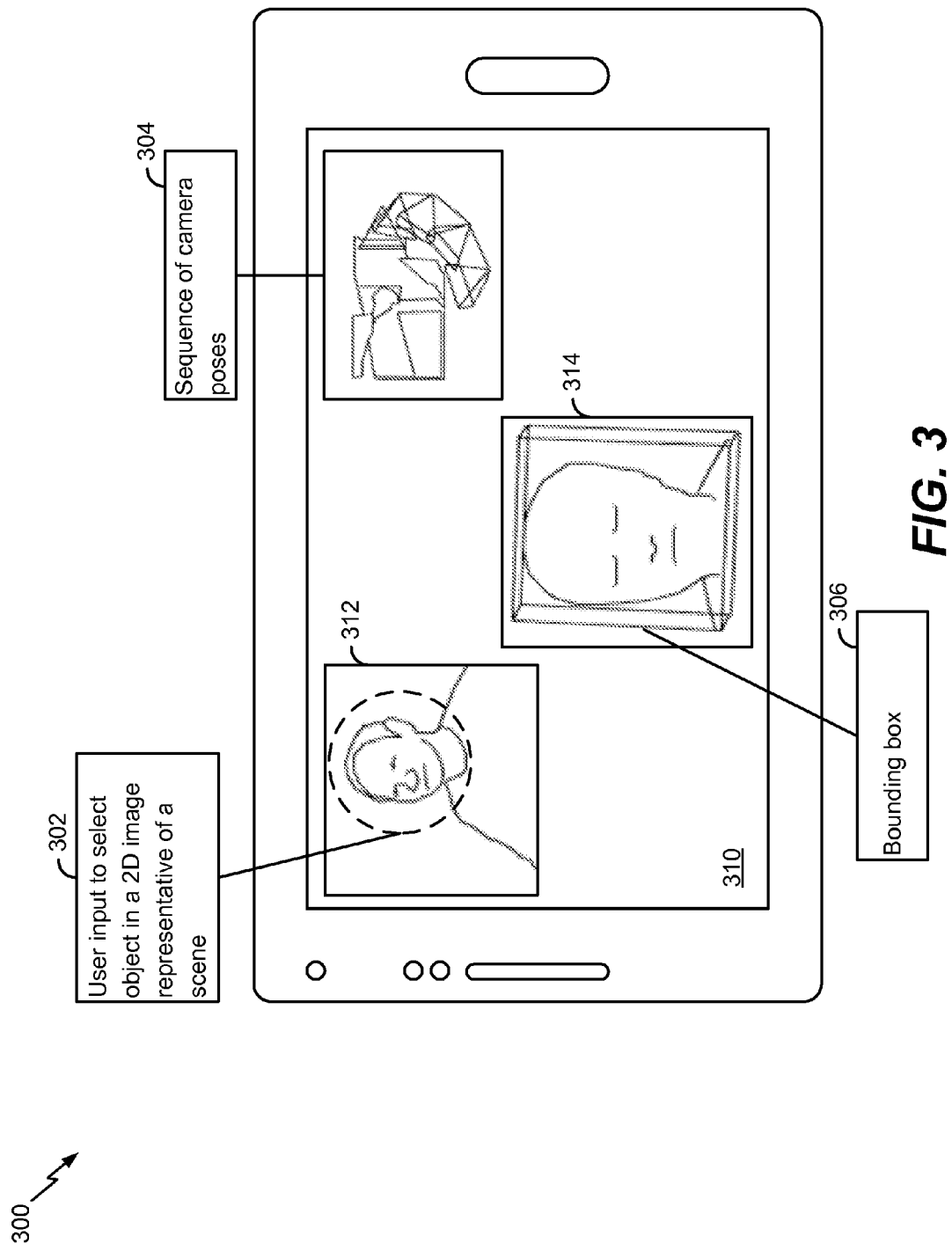
FIG. 3 is a diagram that illustrates a user interface indicating a region of interest in a captured image, a corresponding bounding box of a 3D model, and a sequence of camera poses.

FIG. 3 is a diagram that illustrates a user interface indicating a region of interest in a captured image, a corresponding bounding box of a 3D model and a sequence of camera poses. In FIG. 3, a device 300 includes a user interface, such as a display 310. The device 300 may correspond to or include the system 100 and may be configured to perform one or more of the processes described with reference to the various units and modules of the system 100. Additionally or in the alternative, the device 300 may correspond to, include, or be included within the device 200 of FIG. 2.

In FIG. 3, the display 310 depicts a two-dimensional image 312 of the set of captured images 102 of FIG. 1. The display 310 also includes a representation 314 of a 3D model based on the set of captured images 102 of FIG. 1. In FIG. 3, user input 302 has been received to select a region of interest in the two-dimensional image 312. In some embodiments, the user input 302 may be received via the display 310. In other embodiments, the user input 302 may be received via one or more other user interfaces (e.g., a keypad, a directional button, etc.). The user input 302 to select the region of interest identifies a particular object within the two-dimensional image 312. In response to the user input 302 defining the region of interest in the two-dimensional image 312, a bounding box determination unit, such as the bounding box determination unit 108 of FIG. 1, determines a bounding box 306. The bounding box 306 is associated with multiple size parameters (e.g., (x, y, z) dimension parameters). The bounding box 306 corresponds to at least a portion of the three-dimensional model that includes the region of interest selected by the user input. Thus, in FIG. 3, the bounding box 306 illustrates a boundary of the representation of the three-dimensional model 314 corresponding to (or including) an object identified by the region of interested received via the user input 302. Additionally, the display 310 includes a representation 304 of a sequence of camera poses used to generate the three-dimensional model. The representation 304 of the sequence of camera poses may be updated in real time or near real time while the sequence of camera poses is updated (e.g., during capturing of image frames).

FIG. 4 is a diagram that illustrates a user interface notifying a user that an image capture device is moving too quickly. In FIG. 4, a device 400 includes user interface, such as a display 410. The device 400 may correspond to or include the system 100 and may be configured to perform one or more of the processes described with reference to the various units and modules of the system 100. Additionally or in the alternative, the device 400 may correspond to, include, or be included within the device 200 of FIG. 2 or the device 300 of FIG. 3.

In FIG. 4, the display 410 includes a visual representation of a notification 402 indicating that a device speed satisfies a device speed threshold. In some embodiments, the device speed may satisfy the device speed threshold when the device speed exceeds the device speed threshold. For example, a device speed check unit, such as the device speed check unit 114 of FIG. 1, may determine, based on a plurality of camera poses, timestamps associated with the camera poses, or other information, that an image capture device (e.g., a camera) is moving too quickly relative to an object within the scene to provide a reliable three-dimensional model of the object. Accordingly, the notification 402 may be provided via the display 410 to notify the user to slow down in order to enable gathering of images to generate an accurate model of the object. In alternative embodiments, the device speed may satisfy the device speed threshold when the device speed is less than or equal to the device speed threshold, as described above. In alternative embodiments, the notification 402 may be provided via one or more other user interfaces (e.g., a speaker, an LED light, vibration, etc.). Additionally, while the notification 402 is displayed, image capture by the device 400 may be paused. When the device speed no longer satisfies the device speed threshold, image capture by the device 400 may resume, and the notification 402 is no longer displayed.

Figure 5:
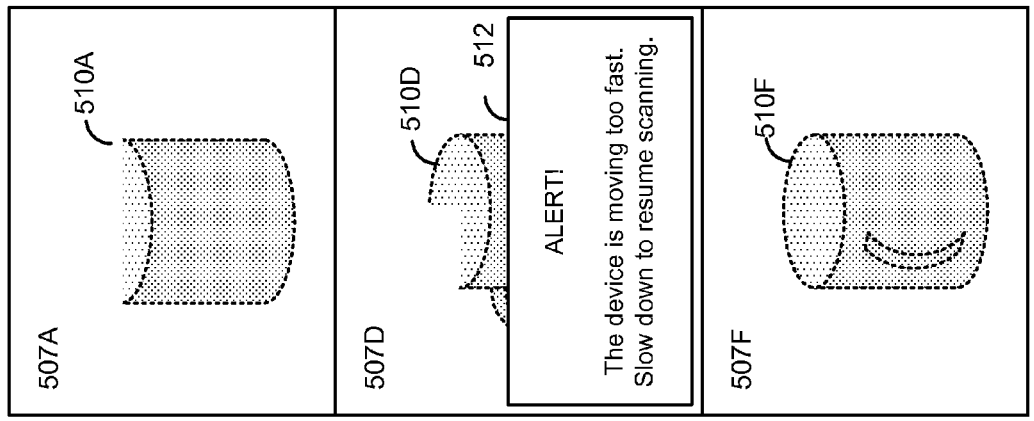
FIG. 5 is a diagram that illustrates a plurality of camera poses.
Figure 5:
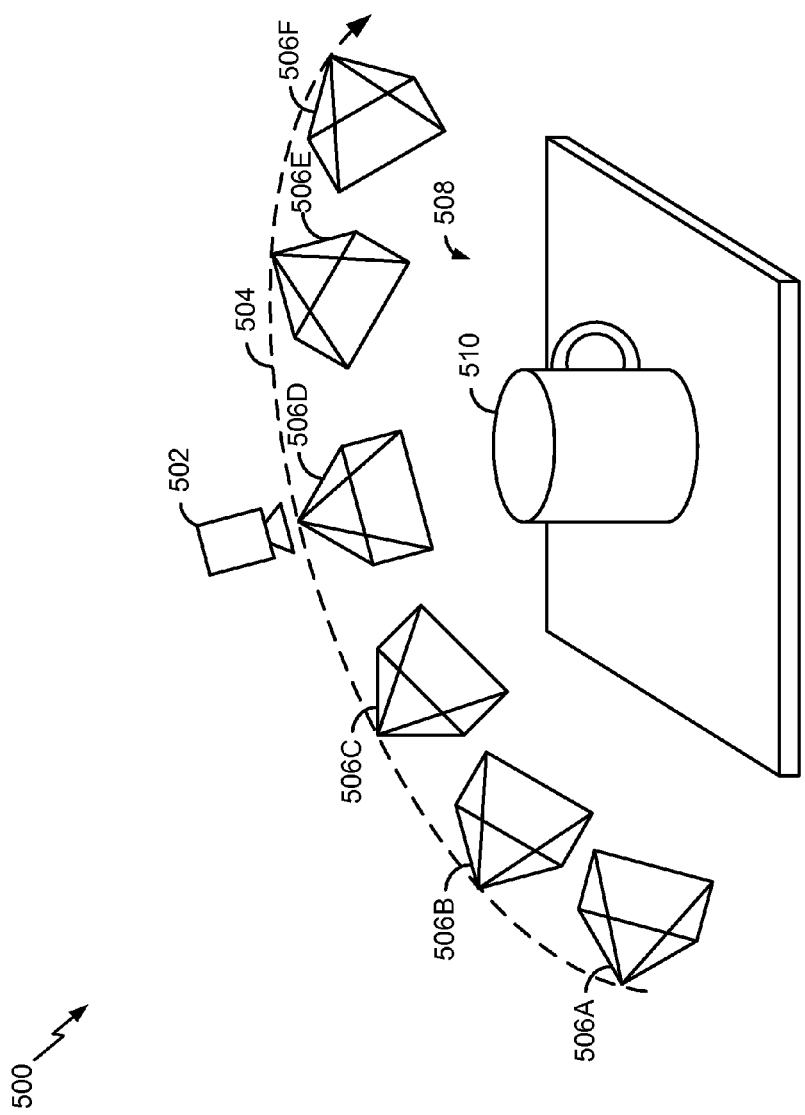

Referring to FIG. 5, an illustrative embodiment of operation of the system 100 of FIG. 1 is shown and generally designated 500. In FIG. 5, an image capture device 502 (e.g., a two-dimensional camera, a depth sensing camera, a three-dimensional camera, etc.) is moved along a path 504 (e.g., an arc) relative to an object 510, such as a cup as shown in FIG. 5. During the movement of the image capture device 502 along the path, the image capture device 502 is located at various positions illustrated in FIG. 5 by camera poses 506A, 506B, 506C, 506D, 506E, and 506F. The camera poses 506A-F correspond to image frames in a sequence of image frames captured by the image capture device 502. It should be noted that the number, separation, and orientation of the camera poses 506A-F shown in FIG. 5 are shown for illustration only, and are not to be considered limiting. For example, more camera poses or fewer camera poses may be used with different intervals between consecutive (or adjacent) camera poses.

The path 504 may be of any configuration, based on how the image capture device 502 is moved around the object 510. As the image capture device 502 is moved along the path 504 from a position associated with the camera pose 506A to a position associated with the camera pose 506F, a 3D point cloud of the object 510 may be generated in real time or near-real time based on the camera poses 506A-F and the sequence of image frames. For example, at the camera pose 506A, which represents an initial camera pose of the image capture device 502 at a first position along the path 504, a first partial 3D point cloud 510A may be generated at the image capture device 502, as shown at 507A. As the image capture device 502 continues to move along the path 504, additional data may be captured and used to add points to the partial 3D point cloud. For example, when the image capture device 502 has moved along the path 504 to a position associated with the camera pose 506D, a more complete 3D point cloud 510D may be generated, as shown at 507D. After the image capture device 502 reaches a position associated with the camera pose 506F, a completed 3D point cloud 510F may be generated, as shown at 507F.

The image capture device 502 or another device may determine based on two or more camera poses and corresponding timestamps (or other information, such as metadata) a rate of movement of the image capture device 502 along the path 504 relative to the object 510. If the rate of movement (e.g., speed) satisfies a threshold (e.g., a speed threshold), a notification 512 may be generated. The notification 512 may advise the user to reduce the rate of movement. For example, the notification 512 may inform the user that the image capture device 502 is moving too quickly relative to the object 510. In other embodiments, the notification 512 may advise the user to increase the rate of movement. In a particular embodiment, image capture by the image capture device 502 may be paused while the notification 512 is provided. The notification 512 may be dismissed when the rate of movement no longer satisfies the threshold.

Thus, FIG. 5 illustrates near-real-time or real-time generation of 3D point cloud data based on motion of the image capture device 502 using images captured by the image capture device 502. Completeness of the 3D point cloud data may depend on the number of images captured and the positioning of the image capture device 502. For example, during generation of the 3D point cloud data, the 3D point cloud data may be incomplete (e.g., before the image capture device reaches 502 the position associated with the camera pose 506F), which may lead to generation of an incomplete 3D representation of the object 510 if additional 3D point cloud data is not gathered. To illustrate, if the image capture device 502 does not capture images of the object 510 from a sufficient number of visible angles of the object 510, a 3D representation of the object 510 may be incomplete. For example, a 3D representation of the object 510 may be incomplete when an image is not captured from a rear view. In this case, more images may need to be captured by the image capture device 502 to complete or fill in gaps in the 3D representation of the object 510.

Figure 6:
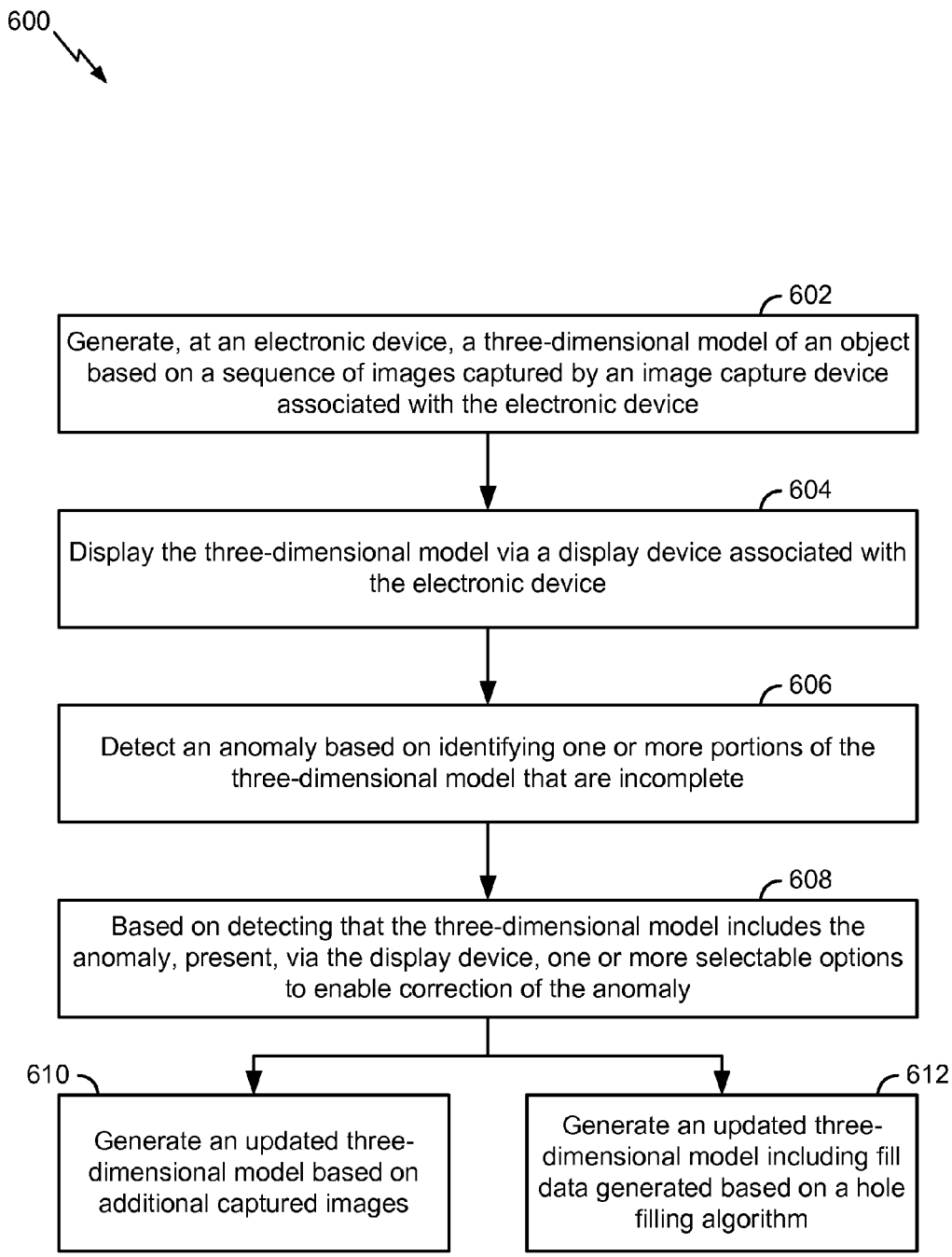
FIG. 6 is a flow diagram of a particular illustrative embodiment of a method of generating a 3D model.

FIG. 6 is a flow diagram of a particular illustrative embodiment of a method 600 of generating a 3D model. The method 600 may be performed by an electronic device, such as a device including the modules or units of the system 100 of FIG. 1, the device 200 of FIG. 2, the device 300 of FIG. 3, the device 400 of FIG. 4, or the image capture device 502 of FIG. 5.

The method 600 includes, at 602, generating, at the electronic device, a three-dimensional (3D) model of an object based on a sequence of images captured by an image capture device associated with the electronic device. For example, the electronic device may include a portable communication device, such as a smart phone, that includes a camera (e.g., a two-dimensional camera, a depth sensing camera, a three-dimensional camera, etc.). In this example, the camera of the portable communication device may be used to capture the sequence of images, and a processor of the portable computing device may generate the 3D model using the sequence of images.

The method 600 also includes, at 604, displaying the 3D model via a display device associated with the electronic device. For example, when the electronic device includes a portable communication device, as described above, a representation of the 3D model may be presented via a display of the portable communication device. In some embodiments, the display may include the display 104 of FIG. 1, the display 210 of FIG. 2, the display 310 of FIG. 3, or the display 410 of FIG. 4. In other embodiments, the display may include a projector associated with the portable communication device.

The method 600 also includes, at 606, detecting an anomaly in the 3D model based on identifying one or more portions of the 3D model that are incomplete. For example, the anomaly may correspond to a portion of the 3D model that is incomplete because no image of the sequence of images includes sufficient data to generate the portion of the 3D model. Detecting the anomaly may be performed by the anomaly detection unit 116 of FIG. 1. The method 600 may also include displaying via the display device an indicator that identifies a location of the anomaly in the three-dimensional model. For example, as described with reference to FIG. 2, the representation of the 3D model 212 may include the indicator 202 that the 3D model includes the anomaly and may identify the location of the anomaly.

The method 600 also includes, at 608, based on detecting that the three-dimensional model includes an anomaly, presenting, via the display device, one or more selectable options to enable correction of the anomaly. For example, as described with reference to FIG. 2, the options may include an option to capture additional images, an option to generate fill data automatically (e.g., based on a hole filling algorithm), or both. The method 600 may also include receiving a selection of a particular selectable option of the one or more selectable options and correcting the anomaly by performing an action corresponding to the particular selectable option. For example, when the option to capture additional images is selected, the method 600 may include, at 610, generating an updated three-dimensional model based on the additional images. The refiner unit 120 may be configured to generate the updated three-dimensional model. As another example, when the option to generate fill data automatically is selected, the method 600 may include, at 612, generating an updated three-dimensional model based on the fill data. The fill data may be generated by the hole filler unit 122 of FIG. 1. Thus, the method 600 enables generation of a 3D model and correction of anomalies in the 3D model in real time or near real time.

Figure 7:
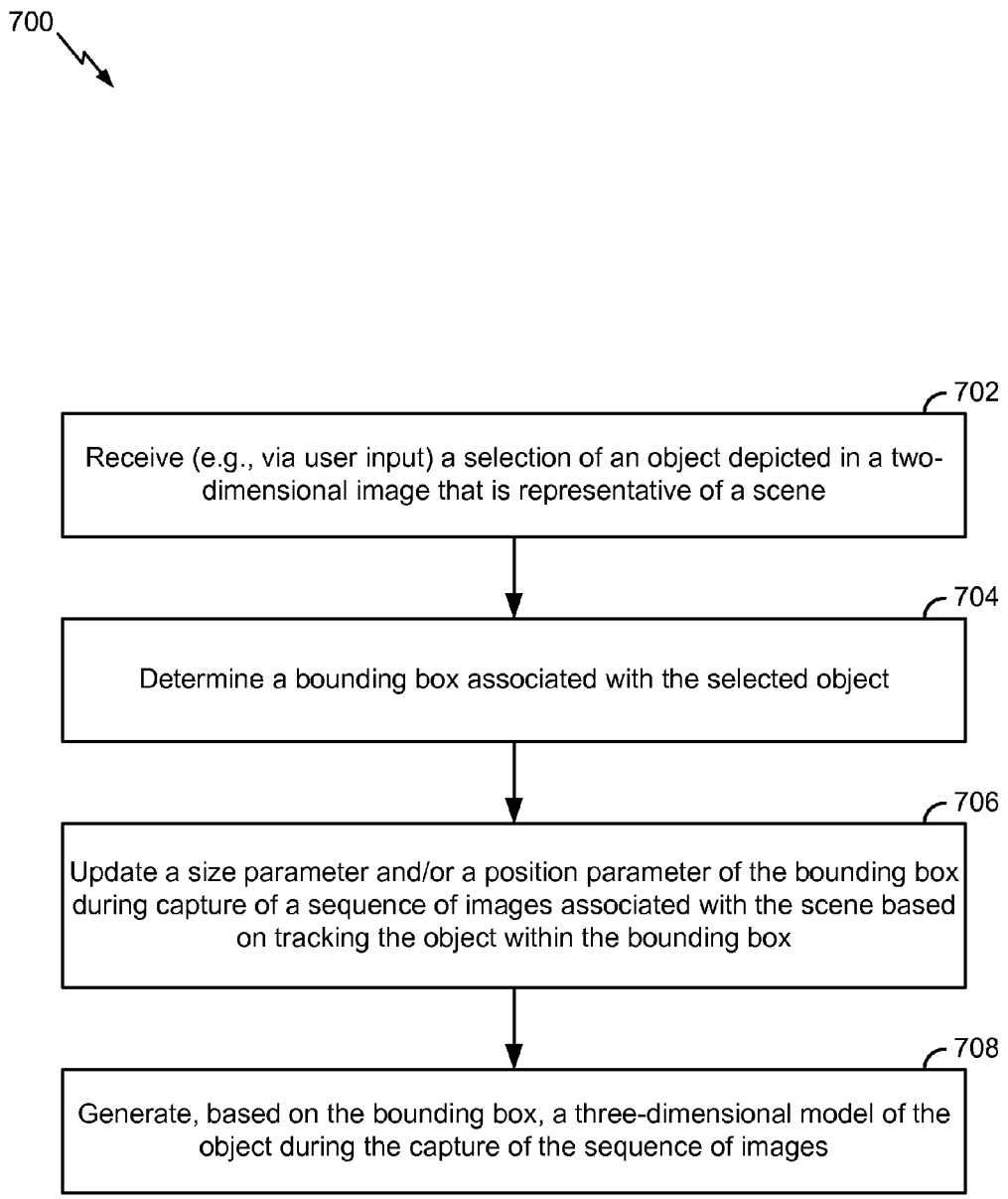
FIG. 7 is a flow diagram of a particular illustrative embodiment of a method of generating a bounding box in 3D model.

FIG. 7 is a flow diagram of a particular illustrative embodiment of a method 700 of generating a bounding box in a 3D model. The method 700 may be performed by an electronic device, such as a device including the modules or units of the system 100 of FIG. 1, the device 200 of FIG. 2, the device 300 of FIG. 3, the device 400 of FIG. 4, or the image capture device 502 of FIG. 5.

The method 700 includes, at 702, receiving, at the electronic device, a selection of an object depicted in a two-dimensional (2D) image that is representative of a scene. For example, the electronic device may include a portable communication device, such as a smart phone, that includes a camera, such as a 2D camera, a 3D camera, a 3D sensor, a depth-sensing camera (e.g., an RGB-D camera), or any other device configured to capture images. In this example, the 2D image may be captured by the camera and may be represented via a display of the portable communication device, and the selection may be received via an input device (such as a touch screen interface) of the portable communication device. In some embodiments, the display may include or correspond to the display 104 of FIG. 1, the display 210 of FIG. 2, the display 310 of FIG. 3, or the display 410 of FIG. 4. In other embodiments, the display may correspond to a projector associated with the portable communication device.

The method 700 may also include, at 704, determining a bounding box associated with the object. For example, the selection of the object may specify a region of interest in the 2D image. During generation of a three-dimensional (3D) model based on the 2D image (and one or more other 2D images), a volume of interest corresponding to the region of interest may be identified. In some embodiments, the bounding box may include or correspond to the bounding box 314 of FIG. 3. The bounding box may be determined to include the volume of interest. Initial dimensions of the bounding box may be based on 3D data points associated with at least a portion of the object during generation of the 3D model. The bounding box may be displayed via the display of the portable communication device during generation of the 3D model.

The method 700 may also include, at 706, adjusting or updating a value of a parameter of the bounding box. For example, the parameter may include a size parameter of the bounding box, a position parameter of the bounding box, or both. The parameter may be adjusted such that a particular object is included within the bounding box after the value of the parameter is adjusted. To illustrate, the parameter may be adjusted or updated based on tracking the object within the bounding box. In this illustrative example, tracking the object may include identifying movement of the object relative to a scene or relative to the camera, and the position parameter may be adjusted or updated based on a relative position of the object in a sequence of images. Alternately or in addition, the parameter may be adjusted or updated based on a determination that an object (e.g., an object that is within the region of interest of the 2D image) is larger than the bounding box in the 3D model. The bounding box displayed via the display may be updated in real time or near real time to reflect the adjusted or updated parameters of the bounding box.

The method 700 may also include, at 708, generating, based on the bounding box, a three-dimensional model of the object during capture of a sequence of images associated with the scene. Further, the 3D model may be refined to correct an anomaly based on detection of the anomaly in the three-dimensional model.

Figure 8:
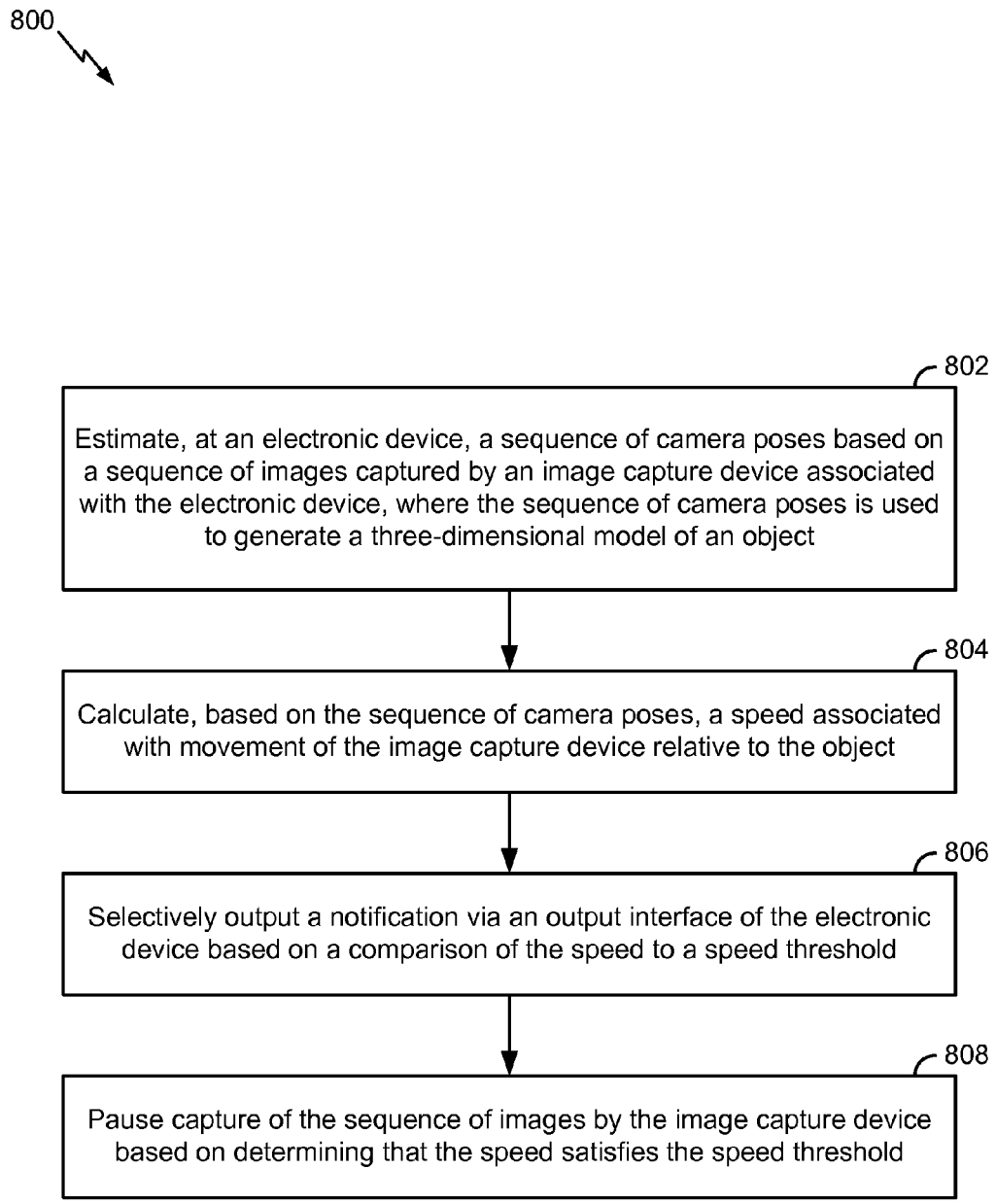
FIG. 8 is a flow diagram of a particular illustrative embodiment of a method of outputting a notification based on a speed of movement of an image capture device.

FIG. 8 is a flow diagram of a particular illustrative embodiment of a method 800 of outputting a notification when an image capture device is moving too quickly. The method 800 may be performed by an electronic device, such as a device including the modules or units of the system 100 of FIG. 1, the device 200 of FIG. 2, the device 300 of FIG. 3, the device 400 of FIG. 4, or the image capture device 502 of FIG. 5.

The method 800 includes, at 802, estimating, at the electronic device, a sequence of camera poses based on a sequence of images captured at an image capture device associated with the electronic device. The sequence of image frames may include or correspond to the set of captured images 102 of FIG. 1. The sequence of camera poses is used to generate a three-dimensional model of an object. For example, the electronic device may include a portable communication device, such as a smart phone, that includes a camera, such as a 2D camera, a 3D camera, a 3D sensor, a depth-sensing camera (e.g., an RGB-D camera), or any other device configured to capture images. In this example, the camera of the portable communication device may be used to capture the sequence of images, and a processor of the portable computing device may generate the 3D model using the sequence of images.

The method 800 may also include, at 804, calculating, based on the sequence of camera poses, a speed associated with movement of the image capture device relative to the object, and, at 806, selectively outputting a notification via an output interface of the electronic device based on a comparison of the speed to a speed threshold. Calculating the speed may be performed by the object tracking unit 112 of FIG. 1. Comparison of the speed to a speed threshold may be performed by the device speed check unit 114 of FIG. 1. For example, when the electronic device includes the portable communication device, the notification may be presented via an audible, visual and/or haptic output of the portable communication device. To illustrate, the portable communication device may beep, vibrate, and/or generate a display that includes the notification. For example, the notification may include the notification 402 of FIG. 4 or the notification 512 of FIG. 5.

In a particular embodiment, the speed is calculated based on timestamps of the sequence of camera poses, and the notification is output when the speed satisfies the speed threshold. For example, the speed may satisfy the speed threshold when the speed is greater than or equal to the speed threshold.

The method 800 may also include, at 808, pausing capture of the sequence of images based on determining that the speed satisfies the speed threshold. For example, when the electronic device includes the portable communication device, the camera of the portable communication device may be disabled until the user acknowledges the notification.

The method 600 of FIG. 6, the method 700 of FIG. 7, the method 800 of FIG. 8, or a combination thereof, may be implemented by a field-programmable gate array (FPGA) device, an application-specific integrated circuit (ASIC), a processing unit such as a central processing unit (CPU), a digital signal processor (DSP), a controller, another hardware device, firmware device, or any combination thereof. As an example, one or more of the method 600 of FIG. 6, the method 700 of FIG. 7, or the method 800 of FIG. 8 may be performed by a processor that executes instructions, as described with respect to FIG. 9.

Figure 9:
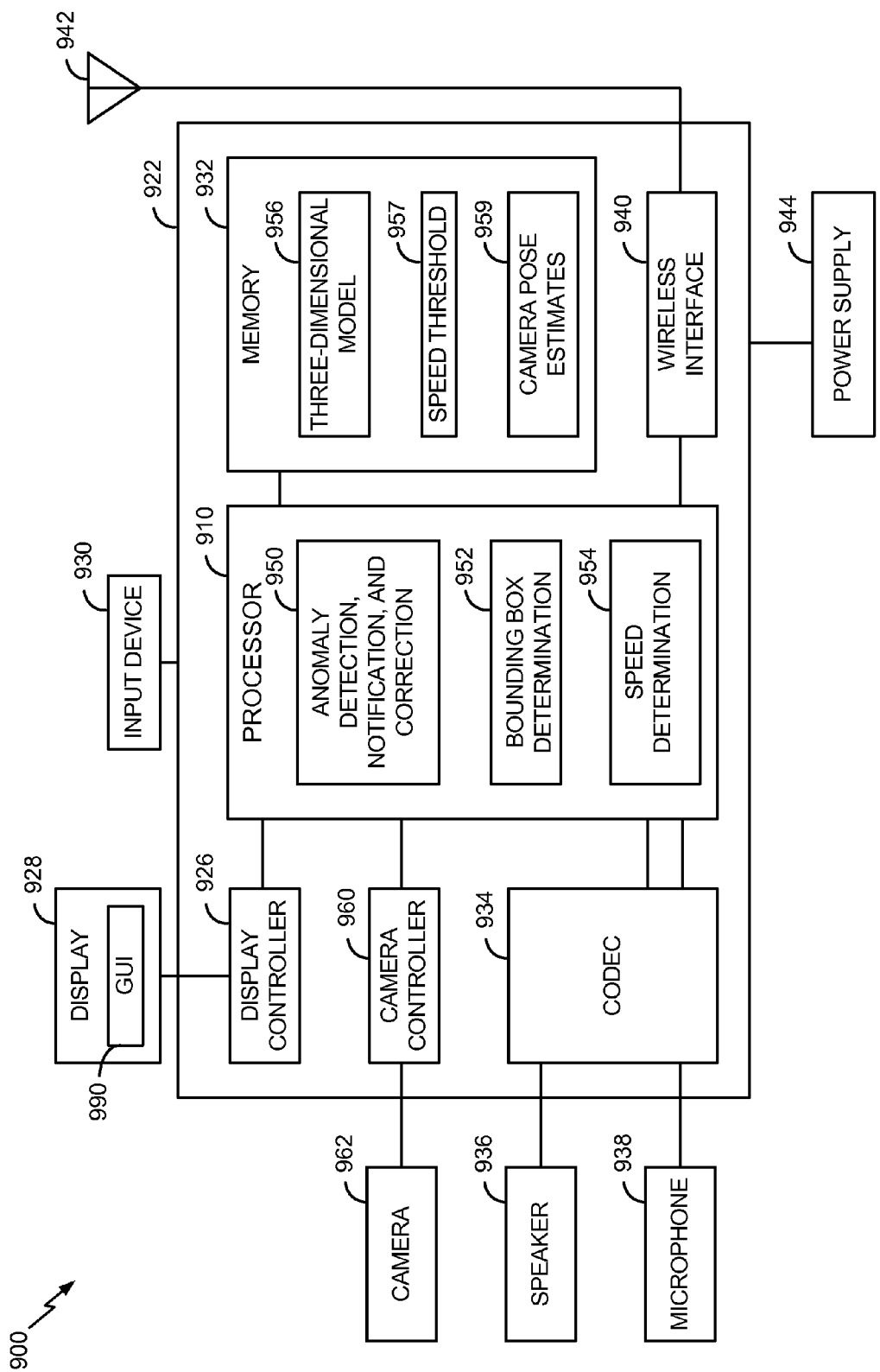
FIG. 9 is a block diagram of a computing device configured to generate a 3D model based on the sequence of image frames.

Referring to FIG. 9, a block diagram of a particular illustrative embodiment of an electronic device, such as a wireless communication device, is depicted and generally designated 900. The device 900 may include or correspond to the system 100 of FIG. 1, the device 200 of FIG. 2, the device 300 of FIG. 3, the device 400 of FIG. 4, or the image capture device 502 of FIG. 5. The device 900 includes a processor 910, such as a digital signal processor (DSP), coupled to a memory 932. The processor 910 may include hardware or executable instructions that cause the processor to perform one or more steps of the method 600 of FIG. 6, the method 700 of FIG. 7, the method 800 of FIG. 8, or a combination thereof.

For example, the processor 910 may include an anomaly detection, notification and correction unit 950. The anomaly detection, notification and correction unit 950 may include circuitry, executable instructions, or both. The anomaly detection, notification and correction unit 950 may include the anomaly detection unit 116 or the 3D model optimizer unit 118 of FIG. 1 The anomaly detection, notification and correction unit 950 may be configured to generate a three-dimensional model 956 of an object based on a sequence of images captured by an image capture device (e.g., a camera 962, such as a 2D camera, a 3D camera, a RGB-D camera, or any device configured to capture images) associated with the electronic device, to display the three-dimensional model via a display device (e.g., a display 928) associated with the electronic device, to detect that the three-dimensional model 956 includes an anomaly, to display via the display device an indicator that identifies a location of the anomaly in the three-dimensional model, to present, via the display device, one or more selectable options to enable correction of the anomaly, to receive a selection of a particular selectable option of the one or more selectable options, to correct the anomaly by performing an action corresponding to the particular selectable option (e.g., to update the three-dimensional model 956), or a combination thereof.

In another example, the processor 910 may include a bounding box determination unit 952. The bounding box determination unit 952 may include circuitry, executable instructions, or both. The bounding box determination unit 952 may include or correspond to the bounding box determination unit 108 of FIG. 1. The bounding box determination unit 952 may be configured to receive a selection of an object depicted in a two-dimensional image that is representative of a scene, to determine a bounding box associated with the object, to generate, based on the bounding box, the three-dimensional model 956 of the object during capture of a sequence of images associated with the scene, to adjust a value of a parameter of the bounding box, to refine the three-dimensional model 956 based on detecting an anomaly in the three-dimensional model 956, to correct the anomaly, or a combination thereof.

In another example, the processor 910 may include a speed determination unit 954. The speed determination unit 954 may include circuitry, executable instructions, or both. The speed determination unit 954 may include or correspond to the object tracking unit 112 of FIG. 1. The speed determination unit 954 may be configured to estimate a sequence of camera poses 959 based on a sequence of images captured at an image capture device (e.g., the camera 962), where the sequence of camera poses 959 is used to generate the three-dimensional model 956 of an object, to calculate, based on the sequence of camera poses 959, a speed associated with movement of the image capture device relative to the object, to selectively output a notification via an output interface (e.g., the display 928 or a speaker 936) of the electronic device based on a comparison of the speed to a speed threshold 957, to pause capture of the sequence of images based on determining that the speed satisfies the speed threshold 957, or a combination thereof.

The memory 932 may be a non-transient or non-transitory computer readable medium storing computer-executable instructions to perform all or a portion of one or more operations described with reference to FIGS. 1-8. Additionally or in the alternative, the memory 932 may store data generated by or used by the processor 910, such as the three-dimensional model 956, the speed threshold 957, the camera pose estimates 959, image data corresponding to the sequence of images, other data, or a combination thereof.

FIG. 9 also shows a display controller 926 that is coupled to the digital signal processor 910 and to a display 928, such as the display 104 of FIG. 1, the display 210 of FIG. 2, the display 310 of FIG. 3, or the display 410 of FIG. 4. A coder/decoder (CODEC) 934 can also be coupled to the digital signal processor 910. A speaker 936 and a microphone 938 can be coupled to the CODEC 934.

FIG. 9 also indicates that a wireless interface 940 can be coupled to the digital signal processor 910 and to an antenna 942. A camera 962 may be coupled to the processor 910 via a camera controller 960. The camera 962 may include a 2D camera, a 3D camera, a 3D sensor, a depth-sensing camera (e.g., an RGB-D camera), or any other device configured to capture images. In a particular embodiment, the processor 910, the display controller 926, the camera controller 960, the memory 932, the CODEC 934, and the wireless interface 940 are included in a system-in-package or system-on-chip device 922. In a particular embodiment, an input device 930 and a power supply 944 are coupled to the system-on-chip device 922. Moreover, in a particular embodiment, as illustrated in FIG. 9, the display 928, the input device 930, the speaker 936, the microphone 938, the antenna 942, the camera 962, and the power supply 944 are external to the system-on-chip device 922. However, each of the display 928, the input device 930, the speaker 936, the microphone 938, the antenna 942, the camera 962, and the power supply 944 can be coupled to a component of the system-on-chip device 922, such as an interface or a controller.

In conjunction with the described embodiments, an apparatus may include means for capturing a sequence of images. The means for capturing the sequence of images may correspond to an image capture device, such as a 2D camera, a 3D camera, a 3D sensor, a depth-sensing camera (e.g., an RGB-D camera), one or more other, structures, devices, or circuits configured to capture images, or any combination thereof. The apparatus may also include means for generating a three-dimensional model of an object based on the sequence of images. The means for generating the three-dimensional model may include the 3D model generation unit 115 of FIG. 1 or the processor 910 of FIG. 9, one or more other, structures, devices, or circuits configured to generate three-dimensional model data, or any combination thereof.

The apparatus may further include means for generating a graphical user interface depicting the three-dimensional model. The means for generating the graphical user interface may include the display 104 of FIG. 1, the display 210 of FIG. 2, the display 310 of FIG. 3, or the display 410 of FIG. 4, the display 928 of FIG. 9, the display controller 926 of FIG. 9, one or more other, structures, devices, or circuits configured to generate the graphical user interface, or any combination thereof. The apparatus may also include means for detecting that the three-dimensional model includes an anomaly. The means for detecting may include the anomaly detection unit 116 of FIG. 1, the 3D model optimizer 118, the anomaly detection, notification, and correction unit 950 of FIG. 9, one or more other, structures, devices, or circuits configured to detect that the three-dimensional model includes the anomaly, or any combination thereof.

In an alternative embodiment, an apparatus may include means for capturing a sequence of images associated with a scene. The means for capturing the sequence of images may include an image capture device, such as a 2D camera, a 3D camera, a 3D sensor, a depth-sensing camera (e.g., an RGB-D camera), one or more other, structures, devices, or circuits configured to capture images, or any combination thereof. The apparatus may also include means for receiving a two-dimensional selection of an object depicted in an image. The means for receiving the two-dimensional selection may include the display 104 of FIG. 1, the display 210 of FIG. 2, the display 310 of FIG. 3, or the display 410 of FIG. 4, the display 928 of FIG. 9, one or more other, structures, devices, or circuits configured to receive the two-dimensional selection, or any combination thereof.

The apparatus may further include means for determining a bounding box associated with the object. The means for determining the bounding box may include the bounding box determination unit 108 of FIG. 1, the bounding box determination unit 952 of FIG. 9, one or more other, structures, devices, or circuits configured to determine the bounding box, or any combination thereof. The apparatus may include means for generating, based on the bounding box, a three-dimensional model of the object during capture of the sequence of images. The means for generating the three-dimensional model may include the 3D model generation unit 115 of FIG. 1, the processor 910 of FIG. 9, one or more other, structures, devices, or circuits configured to generate the three-dimensional model, or any combination thereof.

In yet another embodiment, an apparatus may include means for capturing a sequence of images. The means for capturing the sequence of images may include an image capture device, such as a 2D camera, a 3D camera, a 3D sensor, a depth-sensing camera (e.g., an RGB-D camera), one or more other, structures, devices, or circuits configured to capture images, or any combination thereof. The apparatus may also include means for estimating a sequence of camera poses based on the sequence of images, wherein the sequence of camera poses is used to generate a three-dimensional model of an object. The means for estimating may include the processor 910 of FIG. 9, one or more other, structures, devices, or circuits configured to estimate the sequence of camera poses, or any combination thereof.

The apparatus may further include means for calculating, based the sequence of camera poses, a speed associated with movement of the means for capturing relative to the object. The means for calculating may include the device speed check unit 114 of FIG. 1, the speed determination unit 954 of FIG. 9, one or more other, structures, devices, or circuits configured to calculate the speed, or any combination thereof. The apparatus may further include means for outputting a notification based on a comparison of the speed to a speed threshold. The means for outputting the notification may include the display 104 of FIG. 1, the display 210 of FIG. 2, the display 310 of FIG. 3, or the display 410 of FIG. 4, the display 928 of FIG. 9, one or more other, structures, devices, or circuits configured to output the notification, or any combination thereof.

Those of skill would further appreciate that the various illustrative logical blocks, configurations, modules, circuits, and algorithm steps described in connection with the embodiments disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method comprising:
capturing images by an image capture device;
estimating image capture device positions based on the images;
calculating, based on the image capture device positions and timestamps of the images, a speed associated with movement of the image capture device relative to an object depicted in the images;
determining a bounding box for the object;
generating a three-dimensional model of the object based on the images and the bounding box;
detecting an anomaly in the three-dimensional model;
generating a notification based on a comparison of the speed to a speed threshold;
outputting the notification via an output interface; and
presenting, via a display device, one or more selectable options to enable correction of the anomaly.

2. The method of claim 1, further comprising:
detecting the anomaly in the three-dimensional model based on identifying one or more portions of the three-dimensional model that are incomplete;
displaying via the display device an indicator that identifies a location of the anomaly in the three-dimensional model;
capturing additional images, by the image capture device, corresponding to the one or more portions of the three-dimensional model that are incomplete; and
generating, at the image capture device, an updated three-dimensional model based on the additional images in response to capturing additional images.

3. The method of claim 1, further comprising:
detecting the anomaly in the three-dimensional model based on identifying one or more portions of the three-dimensional model that are incomplete;
receiving a selected option from the one or more selectable options, presented via the display device, to correct the anomaly; and
in response to receiving the selected option, generating an updated three-dimensional model based on fill data.

4. The method of claim 1, further comprising:
detecting the anomaly in the three-dimensional model based on identifying one or more portions of the three-dimensional model that are incomplete;
receiving a selection of a particular selectable option of the one or more selectable options; and
correcting the anomaly by performing an action corresponding to the selection.

5. The method of claim 1, further comprising:
before generating the three-dimensional model, receiving a selection of the object depicted in the images via a graphical user interface on the display device;
depicting, via the graphical user interface, at least a portion of the three-dimensional model; and
presenting, via the graphical user interface, two or more selectable options to enable correction of the anomaly.

6. The method of claim 5, wherein one of the selectable options includes an option to capture additional images.

7. An apparatus comprising:
an image capture device configured to capture images associated with a scene; and
a processor configured to:
receive a selection of an object depicted in an image;
determine a bounding box associated with the object;
generate, based on the bounding box, a three-dimensional model of the object during capture by the image capture device of the images;
estimate image capture device positions relative to the object based on the images;
calculate, based on the image capture device positions and timestamps of the images, a speed associated with movement of the image capture device relative to the object;
compare the speed to a speed threshold;
generate, based on comparing the speed to the speed threshold, a notification to be output via an output interface;
detect an anomaly in the three-dimensional model; and
present, via a display device, one or more selectable options to enable correction of the anomaly.

8. The apparatus of claim 7, wherein the processor is further configured to:
during generation of the three-dimensional model, adjust a value of a size parameter of the bounding box based on tracking the object within the bounding box; and
modify the bounding box based on the value of the size parameter.

9. The apparatus of claim 8, wherein the value is adjusted based on determining that the object is larger than the bounding box.

10. The apparatus of claim 7, wherein the processor is further configured to adjust a value of a position parameter of the bounding box based on tracking the object within the bounding box from one image frame to subsequent image frames.

11. The apparatus of claim 10, wherein tracking the object includes identifying movement of the object relative to the scene.

12. The apparatus of claim 10, wherein the value of the position parameter is adjusted based on a relative position of the object in the images.

13. The apparatus of claim 12, wherein the bounding box contains a region corresponding to the object after the value of the position parameter is adjusted.

14. The apparatus of claim 10, wherein the selection of the object is received via detection of user input.

15. The apparatus of claim 10, wherein the processor is further configured to refine the three-dimensional model based on detecting the anomaly in the three-dimensional model and correcting the anomaly.

16. The apparatus of claim 15, wherein the processor is further configured to adjust a value of a size parameter of the bounding box based on tracking the object within the bounding box.

17. The apparatus of claim 7, wherein the processor is further configured to:
detect the anomaly based on identifying one or more portions of the three-dimensional model that are incomplete;
display via a graphical user interface an indicator that identifies a location of the anomaly in the three-dimensional model, wherein the anomaly includes a portion of the three-dimensional model that is incomplete; and
generate an updated three-dimensional model, in response to selection of an option to capture additional images from the one or more selectable options.

18. The apparatus of claim 7, wherein the processor is further configured to generate an updated three-dimensional model based on fill data, in response to an option to generate the fill data based on a hole filing algorithm being enabled from the one or more selectable options to enable correction of the anomaly.

19. The apparatus of claim 7, wherein the processor is further configured to:
enable a selection of a particular selectable option of the one or more selectable options; and
correct the anomaly by performing an action corresponding to the particular selectable option.

20. The apparatus of claim 7, wherein the processor is further configured to:
generate the notification in response to the speed being equal to or greater than the speed threshold.

21. The apparatus of claim 7, wherein the processor is further configured to:
depict the anomaly in relation to the three-dimensional model via a graphical user interface;
present at least a portion of the three-dimensional model via the graphical user interface; and
based on the anomaly, present, via the graphical user interface, two or more selectable options to enable correction of the anomaly.

22. An apparatus comprising:
means for capturing images;
means for estimating positions of the means for capturing the images based on the images;
means for calculating, based on the positions and timestamps of the images, a speed associated with movement of the means for capturing relative to an object depicted in the images;
means for outputting a notification based on a comparison of the speed to a speed threshold;
means for determining a bounding box associated with the object;
means for generating a three-dimensional model of the object based on the images and the bounding box;
means for detecting an anomaly in the three-dimensional model; and
means for presenting one or more selectable options to enable correction of the anomaly.

23. The apparatus of claim 22, further comprising:
means for receiving a selection of the object in the images; and
means for depicting at least a portion of the three-dimensional model.

24. The apparatus of claim 23, wherein the speed satisfies the speed threshold when the speed is greater than or equal to the speed threshold.

25. The apparatus of claim 23, wherein, when the speed is determined to satisfy the speed threshold, the means for capturing the images is paused or stopped.

26. The apparatus of claim 22, wherein the notification comprises a visual notification.

27. A non-transitory computer-readable medium comprising instructions that, when executed by a computer, cause the computer to:
obtain images;
estimate positions based on the images;
calculate, based on the positions and timestamps of the images, a speed associated with movement relative to an object depicted in the images;
output a notification based on a comparison of the speed to a speed threshold;
determine a bounding box associated with the object;
generate a three-dimensional model of the object based on the images;
detect an anomaly in the three-dimensional model; and
present, via a display device, one or more selectable options to enable correction of the anomaly.

28. The non-transitory computer-readable medium of claim 27, wherein the instructions further cause the computer to:
present at least a portion of the three-dimensional model via a graphical user interface; and
present, via the graphical user interface, two or more selectable options to enable correction of the anomaly.

* * * * *